March 5, 1957   F. W. LINDBLOM   2,783,681
BRIDGE AND NOSE PAD STRUCTURE FOR AN OPHTHALMIC MOUNTING
Filed Nov. 27, 1953
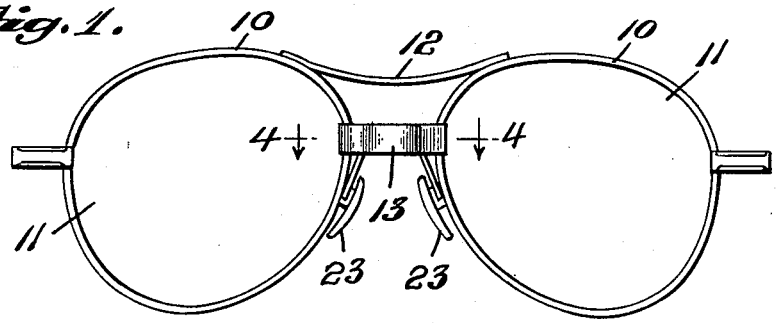
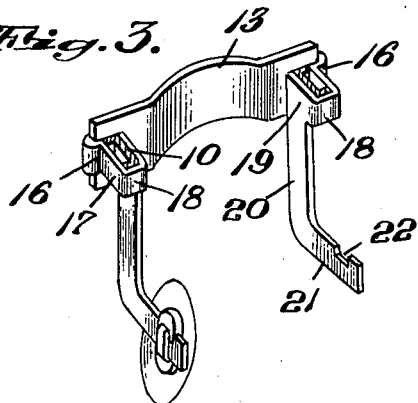
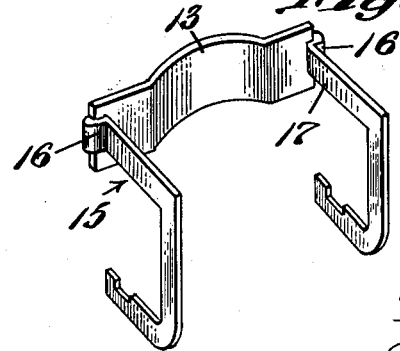
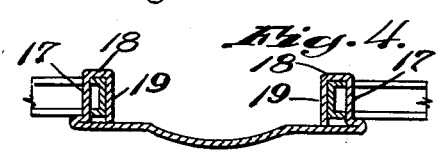
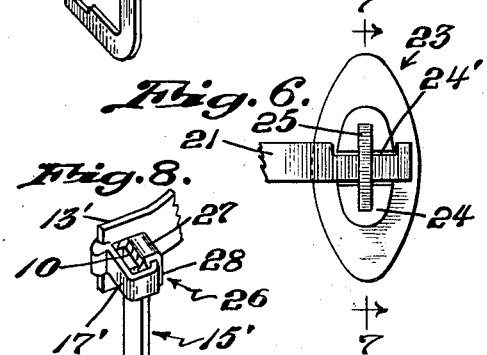
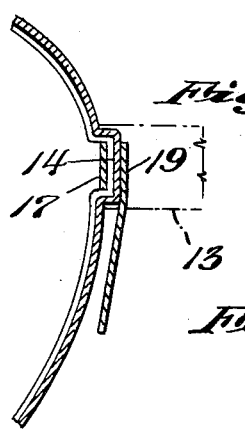
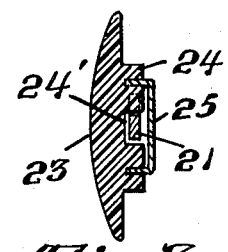
INVENTOR.
Frank W. Lindblom
BY
Barlow & Barlow
ATTORNEYS.

United States Patent Office 2,783,681
Patented Mar. 5, 1957

2,783,681

BRIDGE AND NOSE PAD STRUCTURE FOR AN OPHTHALMIC MOUNTING

Frank W. Lindblom, Warwick, R. I., assignor to Welsh Manufacturing Company, a corporation of Rhode Island Application November 27, 1953, Serial No. 394,662

1 Claim. (Cl. 88—43)

This invention relates to an ophthalmic mounting and more particularly to the bridge and nose pad structure thereof. This invention is a continuation in part of my application Serial No. 316,004, filed October 21, 1952, now Patent No. 2,773,423.

One of the objects of this invention is to provide a bridge for connecting the rims of lenses which may be secured in position without the use of solder and yet provide a structure which will have a good appearance.

Another object of the invention is to provide a bridge which will cover the means of securing it to the lens rims of the mounting.

Another object of the invention is to provide nose pad arms which may be secured in position without the use of solder by means which is used to secure the bridge in position.

More specifically an object of the invention is to provide the bridge and nose pad arms from a single piece of material by folding the stock from which they are formed and secure both of these in position at the same time.

With these and other objects in view, the invention consists of certain novel features of construction as will be more fully described and particularly pointed out in the appended claims.

In the accompanying drawings:

Figure 1 is a front view of the ophthalmic mounting with my bridge and nose pad arms in position;

Figure 2 is a perspective view of the bridge and nose pad arms separate from the rims;

Figure 3 is a view similar to Figure 2 but showing in section the rims and the nose pad arms as folded about these rims with the nose pad mounted on one of the arms;

Figure 4 is a section on line 4—4 of Figure 1;

Figure 5 is a vertical section through the offset portion of the rim and the nose pad arm at its juncture with the offset portion and showing in broken lines the position of the bridge;

Figure 6 is a fragmental view showing the mounting of the nose pad on one of the nose pad arms;

Figure 7 is a sectional view on line 7—7 of Figure 6;

Figure 8 is a perspective view of a modified form of bridge and arm showing the two separate and secured together about the rim by bending the parts of one about the other; and Figure 9 is a sectional view through the structure of Figure 8.

In proceeding with this invention, I provide the lens rims with outwardly offset portions along their nasal edge. I then provide a bridge which will be of a length to extend between the rims and cover these offset portions with extensions on the bridge sufficient to be doubled back upon the bridge, thence through the offset portions and about the rim at the offset portions to the outer surface of the rim, and thence downwardly to provide a nose pad arm.

In some cases the nose pad arm may be formed separately and provided with a loop at its upper end so that the arm from the bridge may secure the nose pad arm and the bridge to the offset portion of the rim.

With reference to the drawings, 10—10 designates the lens rims which encircle lenses 11—11. An upper bar 12 extends between the upper edges of the lens rims, while a bridge 13 extends between the lens rims at a point spaced downwardly therefrom. Each of the rims 10 has an outwardly offset portion at 14 beneath the bridge, as shown in Figure 1 but illustrated in greater detail in Figure 5, so as to provide a recess along its inner surface.

The bridge 13 consists of a strip of sheet material which will be of a width greater than the length of the offset portion as seen in Figure 5 with arms 15 of narrower strip stock extending from the ends of the bridge 13. These arms are first folded back upon the bridge as at 16 and then extend rearwardly as at 17, which rearward portion will pass through the space provided by the offset 14 and between it and the lenses 11. The rim portion by being offset will not interfere with the continuous circular edge of the lens. The stock of this arm 15 is then folded in a nasal direction as at 18 and then forwardly as at 19 (see Figure 3) so as to embrace the lens rim 10 at the offset portion 14 as shown more particularly in Figure 3. The arms 15 are shaped to extend downwardly as at 20 and rearwardly as at 21 where they are notched as at 22 for the reception of a nose pad 23.

This nose pad may be supported in any suitable manner but is here shown as formed of non-metallic material with a boss 24 having a slot 24' for the reception of the notched portion of the arm 21, while there is a strap 25 through which the notched portion of the arm may be passed, and then the strap is pressed inwardly so as to locate the notched portion 22 of the arm in the slot 24' with the shoulders of the notch on either side of the boss 24 so as to lock the arm in position.

In Figure 8 I have illustrated the arm 15' as formed separately from the bridge 13' and have formed the upper portion of this arm into a loop 26 by folding it outwardly as at 27 downwardly as at 28 and inwardly as at 29 as shown in Figure 9. This loop portion is then placed along the outer surface of the offset 14, as seen in Figure 9, and the arm of the bridge 17' is passed through the offset along the inner surface of the rim and thence forwardly through the loop 26 as at 19' to lock the assembly together. The arms which pass through the offset 14 are of a size to snugly embrace this offset so that when tightly folded about it, they will hold the rims rigidly in position. The arms which extend downwardly for supporting the nose pad are of sufficient length so as to have substantial resiliency or spring action so that they may be easily spread apart slightly when resting upon the nose so as to provide a more comfortable mounting for wear.

From the foregoing it will appear that I may secure the lens rims together without the use of solder in tightly bound and assembled relation and at the same time secure nose pad arms in position without the use of solder either with the arms and bridge formed separately or the arms and bridge formed all of the same one piece of material.

I claim:

In an ophthalmic mounting, a pair of lens rims of generally rectangular cross section, each having an offset portion along its nasal edge, a rigid bridge member of sheet metal extending between said rims and overlapping said offset portions, an arm of the same piece of material as the bridge extending from each end of the bridge along the bridge toward its mid point, then rearwardly at generally right angle to the bridge through the offset portion of the rim overlapped by the bridge and thence in right angular bends about the rim to embrace the rim, and said arms then extending downwardly from the outer surface of the rim in the same plane as the last bent portion and then rearwardly providing an L shape for the support of nose pads.

References Cited in the file of this patent

UNITED STATES PATENTS

| | | | |
|---|---|---|---|
| D. 33,243 | Adt | Sept. 25, | 1900 |
| 459,234 | Rubel | Sept. 8, | 1891 |
| 960,924 | Hoffman | June 7, | 1910 |
| 1,151,641 | Willson et al. | Aug. 31, | 1915 |
| 1,323,995 | Uhlemann | Dec. 2, | 1919 |
| 1,369,040 | Malcom | Feb. 22, | 1921 |
| 1,531,628 | Shindel | Mar. 31, | 1925 |

FOREIGN PATENTS

| | | | |
|---|---|---|---|
| 301,721 | Great Britain | Feb. 14, | 1929 |